(12) United States Patent
Dong et al.

(10) Patent No.: US 11,899,323 B2
(45) Date of Patent: Feb. 13, 2024

(54) DISPLAY PANEL

(71) Applicant: TCL CHINA STAR OPTOELECTRONICS TECHNOLOGY CO., LTD., Guangdong (CN)

(72) Inventors: Chengcai Dong, Guangdong (CN); Ding Li, Guangdong (CN); Yi Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 258 days.

(21) Appl. No.: 17/600,171

(22) PCT Filed: Aug. 3, 2021

(86) PCT No.: PCT/CN2021/110232
§ 371 (c)(1),
(2) Date: Sep. 30, 2021

(87) PCT Pub. No.: WO2023/004841
PCT Pub. Date: Feb. 2, 2023

(65) Prior Publication Data
US 2023/0026529 A1    Jan. 26, 2023

(30) Foreign Application Priority Data

Jul. 26, 2021 (CN) .......................... 202110843199.4

(51) Int. Cl.
*G02F 1/1362* (2006.01)
*G02F 1/1343* (2006.01)

(52) U.S. Cl.
CPC .. *G02F 1/136222* (2021.01); *G02F 1/134345* (2021.01); *G02F 1/136209* (2013.01); *G02F 1/136286* (2013.01)

(58) Field of Classification Search
CPC ......... G02F 1/136222; G02F 1/136286; G02F 1/133512; G02F 1/134345
See application file for complete search history.

(56) References Cited

U.S. PATENT DOCUMENTS

2012/0105784 A1    5/2012   Ho et al.
2016/0161794 A1*   6/2016   Kim .................. G02F 1/133377
                                                                         438/23

(Continued)

FOREIGN PATENT DOCUMENTS

CN      201754209 U    3/2011
CN      102879966 A    1/2013

(Continued)

OTHER PUBLICATIONS

International Search Report in International application No. PCT/CN2021/110232, dated Apr. 25, 2022.

(Continued)

*Primary Examiner* — James A Dudek
(74) *Attorney, Agent, or Firm* — Mark M. Friedman (57) ABSTRACT

Embodiments of this application disclose a display panel. A primary pixel electrode is disposed inside a primary pixel region, and a sub-pixel electrode is disposed inside a sub-pixel region. First shading strips and second shading strips are intersected to form a plurality of primary frame bodies. One primary frame body correspondingly encloses a circumferential side of one pixel region. A third shading strip is disposed inside the primary frame body and correspondingly disposed between the primary pixel region and the sub-pixel region. The third shading strip and the primary frame body define two sub-frame bodies, and a channel for (Continued)

making the two sub-frame bodies communicate is disposed on the third shading strip.

18 Claims, 5 Drawing Sheets

(56) References Cited

U.S. PATENT DOCUMENTS

| | | | |
|---|---|---|---|
| 2016/0274403 | A1 | 9/2016 | Araki et al. |
| 2017/0178579 | A1* | 6/2017 | Kim .................. G02F 1/136286 |

FOREIGN PATENT DOCUMENTS

| | | |
|---|---|---|
| CN | 104483790 A | 4/2015 |
| CN | 105607358 A | 5/2016 |
| CN | 106556946 A | 4/2017 |
| CN | 107526202 A | 12/2017 |
| CN | 108227284 A | 6/2018 |
| CN | 109270734 A | 1/2019 |
| CN | 110187545 A | 8/2019 |
| CN | 111596486 A | 8/2020 |
| CN | 111624803 A | 9/2020 |
| CN | 111624820 A | 9/2020 |
| JP | 2010181726 A | 8/2010 |
| TW | 200801658 A | 1/2008 |
| WO | 2008081614 A1 | 7/2008 |

OTHER PUBLICATIONS

Written Opinion of the International Search Authority in International application No. PCT/CN2021/110232, dated Apr. 25, 2022.
Chinese Office Action issued in corresponding Chinese Patent Application No. 202110843199.4 dated Feb. 10, 2022, pp. 1-6.

* cited by examiner

DISPLAY PANEL

TECHNICAL FIELD

This application relates to display technologies, and specifically, to a display panel.

RELATED ART

For liquid crystal pixels, some pixel electrodes controlled by voltage control brightness of pixels as a whole. Metal wires, via holes, and other elements that are not controlled by voltage are usually shaded by a black absorbing material, that is, shaded by a black matrix (BM).

As the BM is relatively thick, the terrain formed after BM processing is finished causes certain restrictions on flow of an alignment film. A thickness of the BM is much greater than a thickness of the alignment film, so that the terrain of an inner region of a primary frame body formed by a peripheral channel region of the BM is relatively low, thereby forming a concave structure. If a size of the primary frame body enclosed by the BM is too small, and a gap of a nozzle array used for spraying an alignment film material is greater than the size of the primary frame body, during spraying, some regions inside the primary frame body are not sprayed with the alignment film material and are not capable of performing alignment.

In a process of researching and practicing the related art, it is found in this application that, in a pixel electrode including at least two sub-pixel regions, a region between a primary pixel region and a sub-pixel region is a region in which the liquid crystal is not controlled. In the related art, a BM is correspondingly set for the region, but after region segmentation, sizes of primary frame bodies of BMs respectively corresponding to the primary pixel region and the sub-pixel region are too small, resulting in a risk that the alignment film cannot cover a region inside a primary frame body of the BM.

SUMMARY

Embodiments of this application provide a display panel, which may reduce a risk that an alignment film cannot cover a region inside a frame body due to a too small size of a primary frame body enclosed by a BM.

An embodiment of this application provides a display panel, comprising scanning lines and data lines, the scanning lines and the data lines being intersected to form a plurality of pixel regions, the pixel regions comprising primary pixel regions and sub-pixel regions spaced apart from the primary pixel regions, where the display panel comprises:
  a plurality of pixel electrodes, the pixel electrodes comprising primary pixel electrodes and sub-pixel electrodes, the primary pixel electrode being disposed inside the primary pixel region, and the sub-pixel electrode being disposed inside the sub-pixel region;
  a BM layer, the BM layer comprising first shading strips, second shading strips, and third shading strips, the first shading strips and the second shading strips being intersected to form a plurality of primary frame bodies, one primary frame body correspondingly enclosing a circumferential side of one pixel region, the third shading strip being disposed inside the primary frame body and correspondingly disposed between the primary pixel region and the sub-pixel region, and the third shading strip and the primary frame body defining two sub-frame bodies, a channel for making the two sub-frame bodies communicate being disposed on the third shading strip; and
  a first alignment layer, covering the BM layer.

Optionally, in some embodiments of this application, there are a plurality of channels, and the plurality of channels are spaced apart.

Optionally, in some embodiments of this application, at least one channel is disposed in an intermediate region of the third shading strip.

Optionally, in some embodiments of this application, the channel is an opening.

Optionally, in some embodiments of this application, the channel is in a structure with a wide top and a narrow bottom in a thickness direction of the third shading strip.

Optionally, in some embodiments of this application, in an orthographic projection of the third shading strip on a plane in which the BM layer is located, a width of the channel in a direction from the intermediate region to an end surface of the channel is increasing.

Optionally, in some embodiments of this application, in an orthographic projection of the third shading strip on a plane in which the BM layer is located, a width of the channel in a direction from the intermediate region to an end surface of the channel is equal.

Optionally, in some embodiments of this application, a width of the channel is greater than or equal to 10 μm.

Optionally, in some embodiments of this application, the third shading strip covers an entire region between the primary pixel electrode and the sub-pixel electrode; and the third shading strip comprises a hole structure and a shading body layer, the shading body layer covering the hole structure, a hole of the hole structure forming the channel for making the two sub-frame bodies communicate.

Optionally, in some embodiments of this application, the primary pixel electrode and the sub-pixel electrode overlap partially with the third shading strip separately.

Optionally, in some embodiments of this application, in one pixel region, both a primary pixel electrode and a sub-pixel electrode of one pixel electrode are disposed in the pixel region; or
  in one pixel region, a primary pixel electrode of one pixel electrode is disposed inside a primary pixel region, and a sub-pixel electrode of another pixel electrode is disposed inside a sub-pixel region.

Optionally, in some embodiments of this application, the display panel comprises an array substrate and a color film substrate disposed opposite to the array substrate,
  the array substrate comprising a first substrate and a first metal layer, a first insulation layer, a second metal layer, a second insulation layer, the plurality of pixel electrodes, and a second alignment layer that are disposed on the first substrate, the scanning lines being formed at the first metal layer, and the data lines being formed at the second metal layer; and
  the color film substrate comprising a second substrate and the BM layer and the first alignment layer that are disposed on a surface of the second substrate close to the array substrate.

Optionally, in some embodiments of this application, the display panel comprises an array substrate and a color film substrate disposed opposite to the array substrate,
  the array substrate comprising a first substrate and a first metal layer, a first insulation layer, a second metal layer, a second insulation layer, the BM layer, the plurality of pixel electrodes, and the first alignment layer that are disposed on the first substrate, the scanning lines being formed at the first metal layer, and the data lines being formed at the second metal layer; and the color film substrate comprising a second substrate and a second alignment layer that is disposed on a surface of the second substrate close to the array substrate.

An embodiment of this application further provides a display panel, comprising scanning lines and data lines, the scanning lines and the data lines being intersected to form a plurality of pixel regions, the pixel regions comprising primary pixel regions and sub-pixel regions spaced apart from the primary pixel regions, where the display panel comprises:

a plurality of pixel electrodes, the pixel electrodes comprising primary pixel electrodes and sub-pixel electrodes, the primary pixel electrode being disposed inside the primary pixel region, and the sub-pixel electrode being disposed inside the sub-pixel region;

a BM layer, the BM layer comprising first shading strips, second shading strips, and third shading strips, the first shading strips and the second shading strips being intersected to form a plurality of primary frame bodies, one primary frame body correspondingly enclosing a circumferential side of one pixel region, the third shading strip being disposed inside the primary frame body and correspondingly disposed between the primary pixel region and the sub-pixel region, and the third shading strip and the primary frame body defining two sub-frame bodies, a channel for making the two sub-frame bodies communicate being disposed on the third shading strip; and a first alignment layer, covering the BM layer, at least one channel being disposed in an intermediate region of the third shading strip; and the primary pixel electrode and the sub-pixel electrode overlapping partially with the third shading strip separately.

Optionally, in some embodiments of this application, there are a plurality of channels, and the plurality of channels are spaced apart.

Optionally, in some embodiments of this application, the channel is an opening.

Optionally, in some embodiments of this application, the channel is in a structure with a wide top and a narrow bottom in a thickness direction of the third shading strip.

Optionally, in some embodiments of this application, in an orthographic projection of the third shading strip on a plane in which the BM layer is located, a width of the channel in a direction from the intermediate region to an end surface of the channel is increasing.

Optionally, in some embodiments of this application, in an orthographic projection of the third shading strip on a plane in which the BM layer is located, a width of the channel in a direction from the intermediate region to an end surface of the channel is equal.

Optionally, in some embodiments of this application, the third shading strip covers an entire region between the primary pixel electrode and the sub-pixel electrode; and the third shading strip comprises a hole structure and a shading body layer, the shading body layer covering the hole structure, a hole of the hole structure forming the channel for making the two sub-frame bodies communicate.

In the display panel in the embodiments of this application, pixel electrodes comprise primary pixel electrodes and sub-pixel electrodes, the primary pixel electrode being disposed inside a primary pixel region, and the sub-pixel electrode being disposed inside a sub-pixel region. A BM layer is disposed on the pixel electrode. The BM layer comprises first shading strips, second shading strips, and third shading strips, the first shading strips and the second shading strips being intersected to form a plurality of primary frame bodies, one primary frame body correspondingly enclosing a circumferential side of one pixel region. The third shading strip is disposed inside the primary frame body and correspondingly disposed between the primary pixel region and the sub-pixel region. The third shading strip and the primary frame body define two sub-frame bodies, and a channel for making the two sub-frame bodies communicate is disposed on the third shading strip. In this embodiment, the third shading strip divides the primary frame body into two sub-frame bodies. By disposing a channel on the third shading strip, inner spaces of the two sub-frame bodies are in communication, so that in the process of spraying an alignment liquid, as long as an inner space of one sub-frame body is sprayed with the alignment liquid, the liquid can flow to an inner space of an other sub-frame body through the channel, so as to reduce or even avoid a risk that an inner space of one sub-frame body is not covered with an alignment layer.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person skilled in the art may derive other drawings from these accompanying drawings without creative efforts.

DETAILED DESCRIPTION

The technical solutions in embodiments of this application are clearly and completely described below with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application. In addition, it should be understood that the specific implementations described herein are merely used to describe and explain this application, but are not intended to limit this application. In this application, in the absence of any indication to the contrary, the used nouns of locality such as "up" and "down" generally refer to up and down in an actual use or working state of an apparatus, specifically to a surface direction shown in the accompanying drawings. However, "inner" and "outer" are for a contour of the apparatus.

A display panel is provided in an embodiment of this application and is described in detail in the following. It should be noted that, a description sequence of the following embodiments is not used as a limitation to a preferable sequence of the embodiments.

Figure 1:
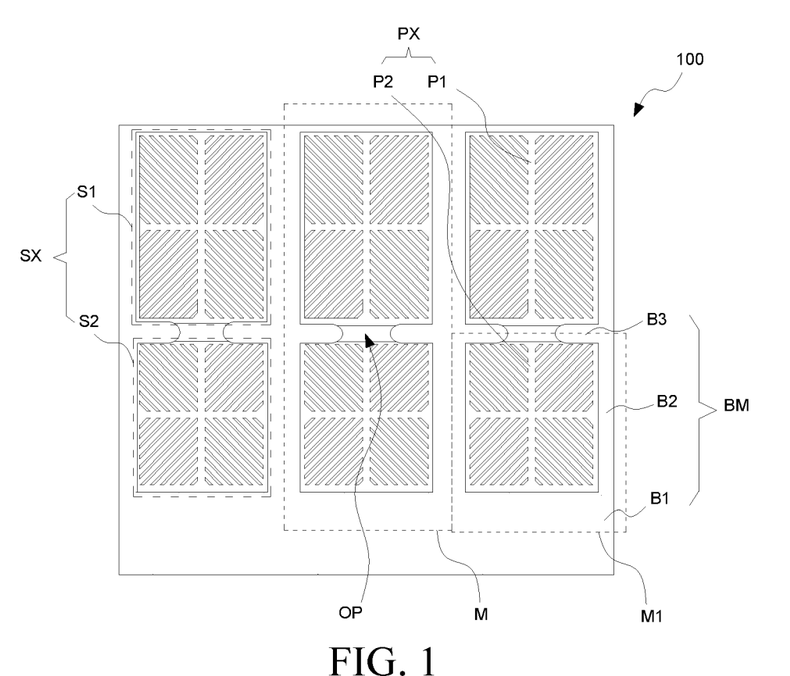
FIG. 1 is a schematic top view of a first structure of a display panel according to an embodiment of this application.
Figure 2:
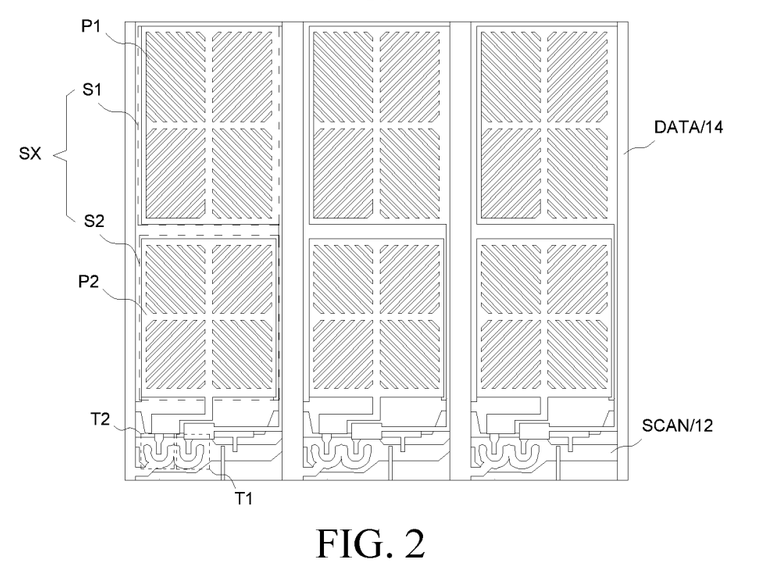
FIG. 2 is a schematic structural diagram of removing a BM layer from FIG. 1.
Figure 3:
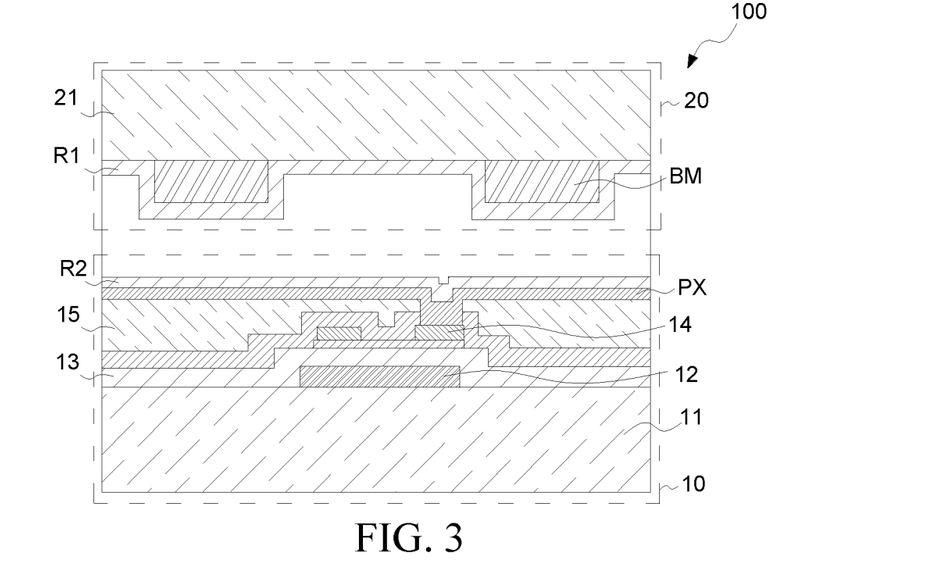
FIG. 3 is a schematic cross-sectional view of a first structure of a display panel according to an embodiment of this application.

Referring to FIG. 1 to FIG. 3, an embodiment of this application provides a display panel 100, including a plurality of scanning lines SCAN, a plurality of data lines DATA, a plurality of pixel electrodes PX, a BM layer BM, and a first alignment layer R1.

The scanning lines SCAN and the data lines DATA are intersected to form a plurality of pixel regions SX. The pixel regions SX include primary pixel regions S1 and sub-pixel regions S2 spaced apart from the primary pixel regions S1.

The pixel electrodes PX include primary pixel electrodes P1 and sub-pixel electrodes P2. The primary pixel electrode P1 is disposed inside the primary pixel region S1. The sub-pixel electrode P2 is disposed inside the sub-pixel region S2.

The BM layer BM includes first shading strips B1, second shading strips B2, and third shading strips B3. The first shading strips B1 and the second shading strips B2 are intersected to form a plurality of primary frame bodies M. One primary frame body M correspondingly encloses a circumferential side of one pixel region SX. The third shading strip B3 is disposed inside the primary frame body M and correspondingly disposed between the primary pixel region S1 and the sub-pixel region S2. The third shading strip B3 and the primary frame body M define two sub-frame bodies M1. A channel OP for making the two sub-frame bodies M1 communicate is disposed on the third shading strip B3.

The first alignment layer R1 covers the BM layer BM.

The third shading strip B3 divides the primary frame body M into two sub-frame bodies M1. By disposing a channel OP on the third shading strip B3, inner spaces of the two sub-frame bodies M1 are in communication, so that in the process of spraying an alignment liquid, as long as an inner space of one sub-frame body M1 is sprayed with the alignment liquid, the liquid can flow to an inner space of an other sub-frame body M1 through the channel OP, so as to reduce or even avoid a risk that an inner space of one sub-frame body M1 is not covered with an alignment layer.

It should be noted that, an inner space of the sub-frame body M1 is a space defined by an outer surface of the third shading strip B3 and an inner surface of the frame body M.

A region between the primary pixel electrode P1 and the sub-pixel electrode P2 is a region in which the liquid crystal is not controlled, and disposing the third shading strip B3 between the primary pixel region S1 and the sub-pixel region S2, that is, disposing the third shading strip B3 in the region in which the liquid crystal is not controlled, is conducive to reducing a dark state brightness of the region in which the liquid crystal is not controlled, improving a contrast, and improving a dark state viewing angle.

Optionally, a material of the BM layer BM is black, and may be a photoresist material, an inorganic material, or a metal material layer.

Optionally, the pixel electrode PX may be made of a metal oxide material such as indium tin oxide.

An extension direction of the first shading strip B1 is parallel to an extension direction of the scanning line SCAN, and the first shading strip B1 shades the scanning line SCAN. An extension direction of the second shading strip B2 is parallel to an extension direction of the data line DATA, and the second shading strip B2 shades the data line DATA.

Optionally, referring to FIG. 1 and FIG. 2, the primary pixel electrode P1 and the sub-pixel electrode P2 overlap partially with the third shading strip B3 separately.

Optionally, an overlapping width of the third shading strip B3 and the primary pixel electrode P1 is between 1 μm and 5 μm, for example, is 1 μm, 2 μm, 3 μm, 4 μm, or 5 μm. An overlapping width of the third shading strip B3 and the sub-pixel electrode P2 is between 1 μm and 5 μm, for example, is 1 μm, 2 μm, 3 μm, 4 μm, or 5 μm.

The primary pixel electrode P1 and the sub-pixel electrode P2 overlap partially with the third shading strip B3 separately, that is, a width of the third shading strip B3 is set to be greater than a width of the region in which the liquid crystal is not controlled, to handle a problem of a contraposition deviation of the BM layer BM and the pixel electrode PX, so as to ensure that the third shading strip B3 can shade, in a width direction, the region in which the liquid crystal is not controlled.

Optionally, referring to FIG. 1 and FIG. 2, in a pixel region SX, both a primary pixel electrode P1 and a sub-pixel electrode P2 of a pixel electrode PX are disposed inside the pixel region SX.

The display panel 100 further includes a first thin film transistor T1 and a second thin film transistor T2. The first thin film transistor T1 is connected to the primary pixel electrode P1, and the second thin film transistor T2 is connected to the sub-pixel electrode P2.

Optionally, referring to FIG. 3, the display panel 100 includes an array substrate 10 and a color film substrate 20 disposed opposite to the array substrate 10.

The array substrate 10 includes a first substrate 11 and a first metal layer 12, a first insulation layer 13, a second metal layer 14, a second insulation layer 15, the plurality of pixel electrodes PX, and a second alignment layer R2 that are disposed on the first substrate 11. The scanning lines SCAN are formed at the first metal layer 12. The data lines DATA are formed at the second metal layer 14.

The color film substrate 20 includes a second substrate 21 and the BM layer BM and the first alignment layer R1 that are disposed on a surface of the second substrate 21 close to the array substrate 10.

In addition to the scanning lines SCAN, the first metal layer 12 further includes a gate and a first common electrode. In addition to the data lines DATA, the second metal layer 14 further includes a shared electrode, a source, and a drain.

The color film substrate 20 further includes a common electrode, and the common electrode is disposed between the BM layer BM and the first alignment layer R1.

Figure 4:
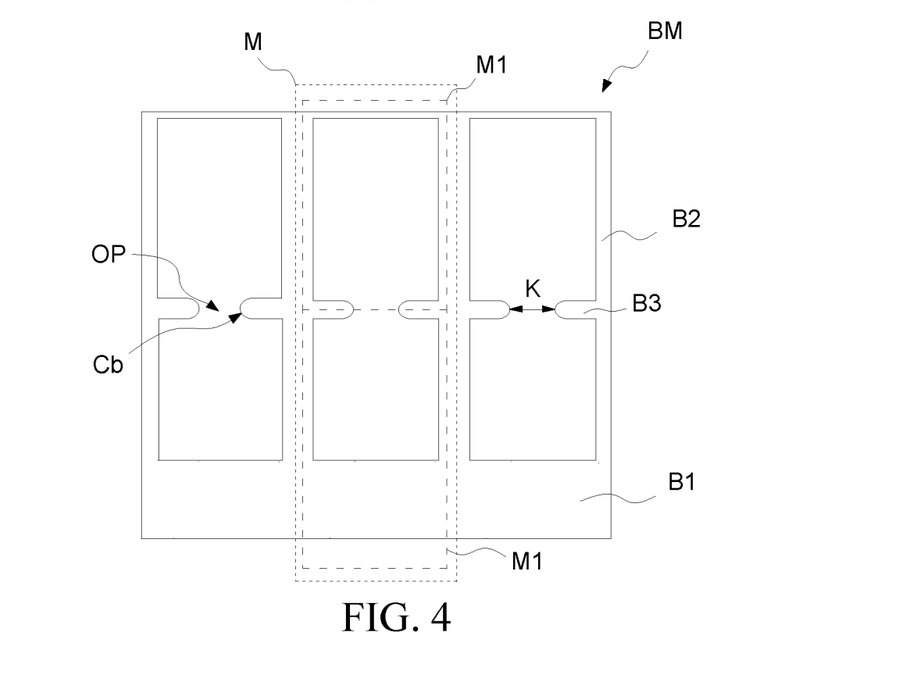
FIG. 4 is a schematic diagram of a BM layer of a first structure of a display panel according to an embodiment of this application.

Referring to FIG. 4, optionally, at least one channel OP is disposed in an intermediate region of the third shading strip B3. This embodiment is described by using one channel OP as an example, but is not limited thereto.

The channel OP is an opening that interrupts the third shading strip B3. Such a setting makes it convenient to simplify a process of forming a channel OP.

According to this embodiment of this application, the channel OP is disposed in the intermediate region of the third shading strip B3, making it convenient for the alignment liquid to flow from an inner space of one sub-frame body M1 to an inner space of an other sub-frame body M1 rapidly and evenly.

Optionally, a width K of the channel OP is greater than or equal to 10 μm, for example, may be 10 μm, 20 μm, 30 μm, 40 μm, 50 μm, 60 μm, 70 μm, 80 μm, 90 μm, or 100 μm.

Optionally, in some embodiments, the width K of the channel OP may alternatively be equal to a length of the third shading strip B3, that is, the third shading strip B3 is not disposed.

Optionally, still referring to FIG. 4, in an orthographic projection of the third shading strip B3 on a plane in which the BM layer BM is located, the width K of the channel OP in a direction from the intermediate region to an end surface of the channel OP is increasing.

While ensuring a width of the channel OP, such a setting can retain the third shading strip B3 as much as possible, to reduce a dark state brightness of the region in which the liquid crystal is not controlled.

Optionally, in an orthographic projection of the third shading strip B3 on a plane in which the BM layer BM is located, and in a direction from the end surface of the channel OP to the intermediate region, a side wall Cb of the channel OP has continuously varying taper angles. According to such a setting, on the one hand, the alignment liquid can run through the channel OP easily; and on the other hand, a sleek design of the side wall of the channel OP can increase a shading area in an orthographic projection direction and improve light absorption of the side wall, and a light absorption region of the entire side wall is homogenized, to further improve the dark state brightness.

Figure 5:
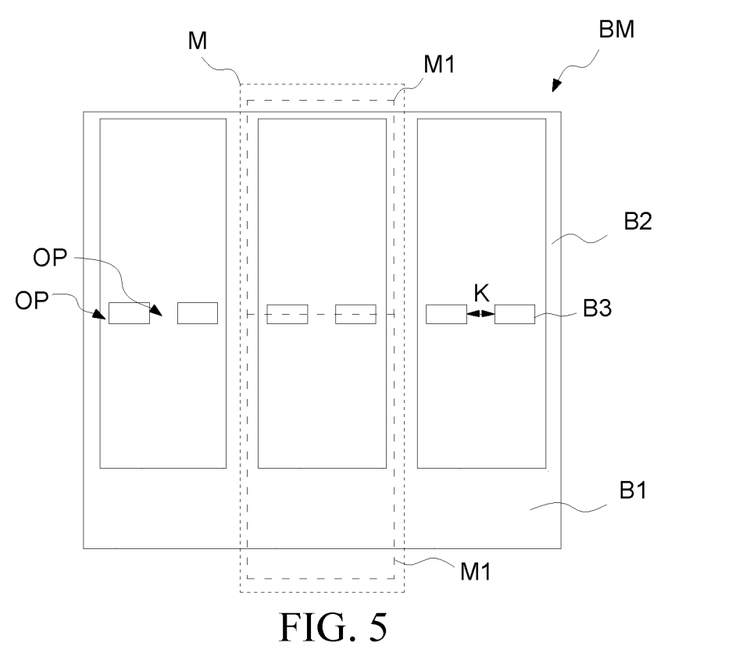
FIG. 5 is another schematic diagram of a BM layer of a first structure of a display panel according to an embodiment of this application.

Optionally, in some embodiments, as shown in FIG. 5, in an orthographic projection of the third shading strip B3 on a plane in which the BM layer BM is located, the width K of the channel OP in a direction from the intermediate region to an end surface of the channel OP is equal.

Optionally, referring to FIG. 5, in some embodiments, there is a plurality of channels OP, and the plurality of channels OP is spaced apart. In a case that a total width of the channels OP is fixed, a manner of spacing the plurality of channels OP can have a better effect of reducing the dark state brightness than a manner of setting a single channel OP, because more light can be absorbed in the manner of spacing the plurality of channels OP.

The total width of the channels OP is a sum of widths of all channels OP on the third shading strip B3.

Figure 6:
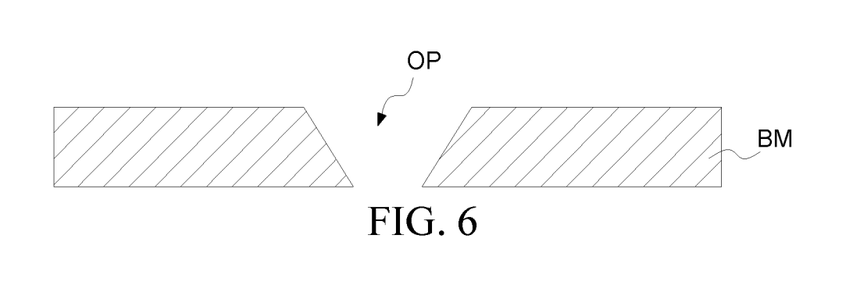
FIG. 6 is a schematic cross-sectional view of a third shading strip of a first structure of a display panel according to an embodiment of this application.

Optionally, referring to FIG. 6, the channel OP is in a structure with a wide top and a narrow bottom in a thickness direction of the third shading strip B3. That is, in a direction from an end of the third shading strip B3 close to the first alignment layer R1 to an end far away from the first alignment layer R1, the width K of the channel OP is decreasing. Such a setting makes it convenient for the alignment liquid to flow through the channel OP.

Figure 7:
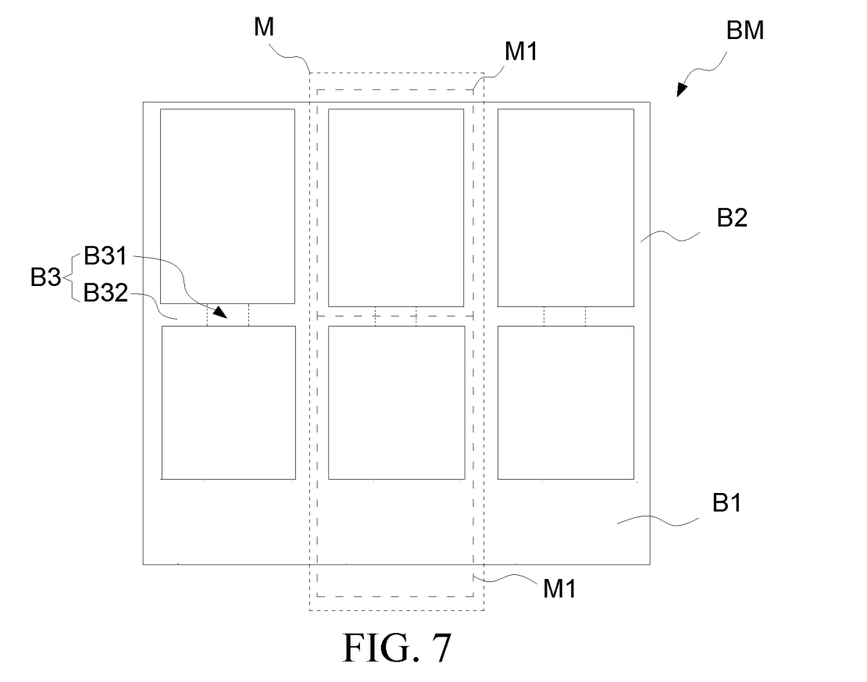
FIG. 7 is a schematic top view of a BM layer of a second structure of a display panel according to an embodiment of this application.
Figure 8:
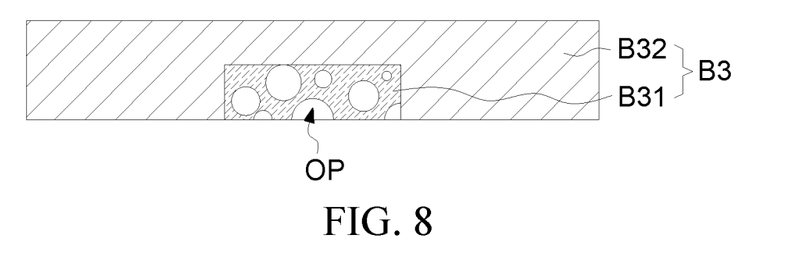
FIG. 8 is a schematic cross-sectional view of a third shading strip of a second structure of a display panel according to an embodiment of this application.

In some embodiments, referring to FIG. 7 and FIG. 8, compared with the foregoing embodiment, a difference between this embodiment and the foregoing embodiment lies in that: the third shading strip B3 covers an entire region between the primary pixel electrode P1 and the sub-pixel electrode P2. The third shading strip B3 includes at least one hole structure B31 and a shading body layer B32. The shading body layer B32 covers the hole structure B31, and a hole of the hole structure B31 forms the channel OP for making the two sub-frame bodies M1 communicate.

Optionally, the hole structure B31 is formed by thermal decomposition of a mixed material, and the mixed material includes a thermal decomposition material and a shading material.

According to such a setting, the two sub-frame bodies M1 are in communication, and the third shading strip B3 covers the entire region in which the liquid crystal is not controlled between the primary pixel electrode P1 and the sub-pixel electrode P2, so that a dark state brightness of the region is minimized.

In addition, the channel OP is formed by using the hole structure B31, and the shading body layer B32 can be better connected and supported while the two sub-frame bodies M1 are in communication, so as to avoid an unstable connection of the shading body layer B32.

In some embodiments, the hole structure may be further replaced with a through hole, that is, a through hole is used as a channel OP. Such a setting better helps the alignment liquid flow through the channel OP. During processing, the thermal decomposition material may be first formed on the region in which the liquid crystal is not controlled, then a BM layer BM covering the thermal decomposition material is formed on the region in which the liquid crystal is not controlled, and then the thermal decomposition material is heated and decomposed into a through hole.

Figure 9:
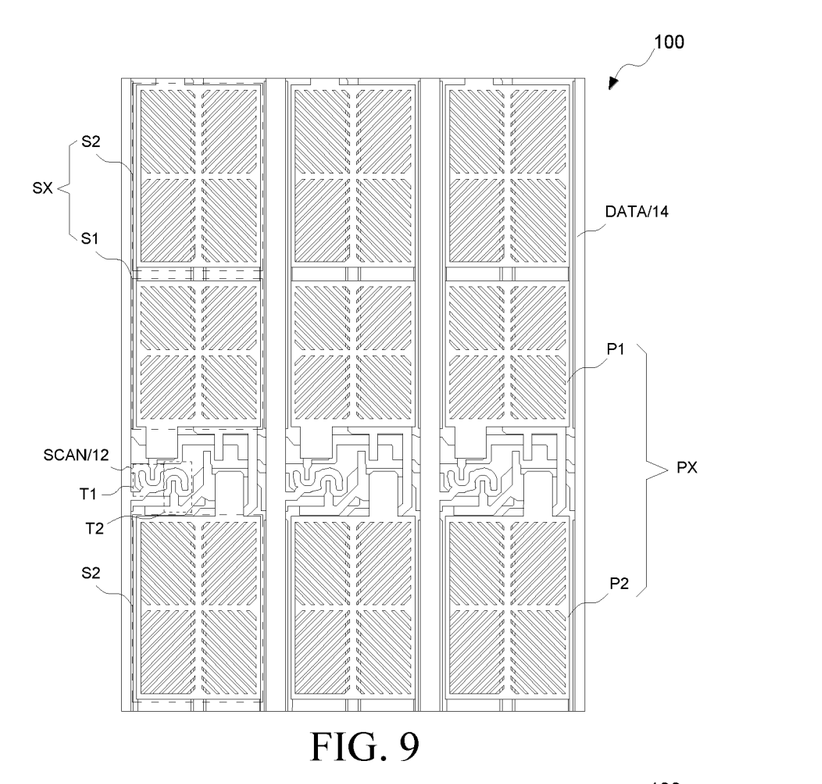
FIG. 9 is a schematic top view of removing a BM layer from a third structure of a display panel according to an embodiment of this application.

In some embodiments, referring to FIG. 9, compared with the foregoing embodiment, a difference between this embodiment and the foregoing embodiment lies in that: in one pixel region SX, a primary pixel electrode P1 of one pixel electrode PX is disposed inside a primary pixel region S1, and a sub-pixel electrode P2 of another pixel electrode PX is disposed inside a sub-pixel region S2.

That is, the BM layer BM is disposed on the color film substrate 20.

Figure 10:
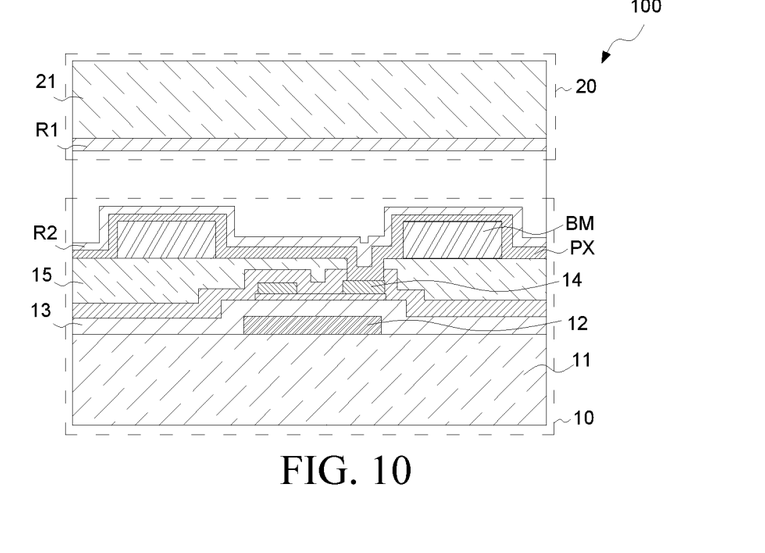
FIG. 10 is a schematic cross-sectional view of a fourth structure of a display panel according to an embodiment of this application.

Referring to FIG. 10, optionally, in some embodiments, the BM layer BM may be disposed on the array substrate 10. A difference between this embodiment and the foregoing embodiment lies in that:

the display panel 100 includes an array substrate 10 and a color film substrate 20 disposed opposite to the array substrate 10.

The array substrate 10 includes a first substrate 11 and a first metal layer 12, a first insulation layer 13, a second metal layer 14, a second insulation layer 15, a BM layer BM, a plurality of pixel electrodes PX, and a first alignment layer R1 that are disposed on the first substrate 11. The scanning lines SCAN are formed at the first metal layer 12, and the data lines DATA are formed at the second metal layer 14.

The color film substrate 20 includes a second substrate 21 and a second alignment layer R2 that is disposed on a surface of the second substrate 21 close to the array substrate 10.

The color film substrate 20 further includes a common electrode, and the common electrode is disposed between the second substrate 21 and the second alignment layer R2.

In the display panel in the embodiments of this application, pixel electrodes PX include primary pixel electrodes P1 and sub-pixel electrodes P2. The primary pixel electrode P1 is disposed inside a primary pixel region S1, and the sub-pixel electrode P2 is disposed inside a sub-pixel region S2. The BM layer BM includes first shading strips B1, second shading strips B2, and third shading strips B3. The first shading strips B1 and the second shading strips B2 are intersected to form a plurality of primary frame bodies M.

One primary frame body M correspondingly encloses a circumferential side of one pixel region SX. The third shading strip B3 is disposed inside the primary frame body M and correspondingly disposed between the primary pixel region S1 and the sub-pixel region S2. The third shading strip B3 and the primary frame body M define two sub-frame bodies M1, and a channel OP for making the two sub-frame bodies M1 communicate is disposed on the third shading strip B3. In this embodiment, the third shading strip B3 divides the primary frame body M into two sub-frame bodies M1. By disposing a channel OP on the third shading strip B3, inner spaces of the two sub-frame bodies M1 are in communication, so that in the process of spraying an alignment liquid, as long as an inner space of one sub-frame body M1 is sprayed with the alignment liquid, the liquid can flow to an inner space of an other sub-frame body M1 through the channel OP, so as to reduce or even avoid a risk that an inner space of one sub-frame body M is not covered with an alignment layer.

A display panel provided in the embodiments of this application is described above in detail. Although the principles and implementations of this application are described by using specific examples in the specification, the foregoing descriptions of the embodiments are only intended to help understand the method and core idea of this application. Moreover, a person skilled in the art may make modifications to the specific implementations and application range according to the idea of this application. In conclusion, the content of the specification is not to be construed as a limitation to this application.

What is claimed is:

1. A display panel, comprising scanning lines and data lines, the scanning lines and the data lines being intersected to form a plurality of pixel regions, the pixel regions comprising primary pixel regions and sub-pixel regions spaced apart from the primary pixel regions, wherein the display panel comprises:
    a plurality of pixel electrodes, the pixel electrodes comprising primary pixel electrodes and sub-pixel electrodes, the primary pixel electrode being disposed inside the primary pixel region, and the sub-pixel electrode being disposed inside the sub-pixel region;
    a black matrix (BM) layer, the BM layer comprising first shading strips, second shading strips, and third shading strips, the first shading strips and the second shading strips being intersected to form a plurality of primary frame bodies, one primary frame body correspondingly enclosing a circumferential side of one pixel region, the third shading strip being disposed inside the primary frame body and correspondingly disposed between the primary pixel region and the sub-pixel region, and the third shading strip and the primary frame body defining two sub-frame bodies, a channel for making the two sub-frame bodies communicate being disposed on the third shading strip; and
    a first alignment layer, covering the BM layer,
    wherein there are a plurality of channels, and the plurality of channels are spaced apart.

2. The display panel according to claim 1, wherein at least one channel is disposed in an intermediate region of the third shading strip.

3. The display panel according to claim 1, wherein the channel is an opening.

4. The display panel according to claim 3, wherein the channel is in a structure with a wide top and a narrow bottom in a thickness direction of the third shading strip.

5. The display panel according to claim 3, wherein in an orthographic projection of the third shading strip on a plane in which the BM layer is located, a width of the channel in a direction from the intermediate region to an end surface of the channel is increasing.

6. The display panel according to claim 3, wherein in an orthographic projection of the third shading strip on a plane in which the BM layer is located, a width of the channel in a direction from the intermediate region to an end surface of the channel is equal.

7. The display panel according to claim 3, wherein a width of the channel is greater than or equal to 10 μm.

8. The display panel according to claim 1, wherein the third shading strip covers an entire region between the primary pixel electrode and the sub-pixel electrode; and the third shading strip comprises a hole structure and a shading body layer, the shading body layer covering the hole structure, a hole of the hole structure forming the channel for making the two sub-frame bodies communicate.

9. The display panel according to claim 1, wherein the primary pixel electrode and the sub-pixel electrode overlap partially with the third shading strip separately.

10. The display panel according to claim 1, wherein in one pixel region, both a primary pixel electrode and a sub-pixel electrode of one pixel electrode are disposed in the pixel region; or
    in one pixel region, a primary pixel electrode of one pixel electrode is disposed inside a primary pixel region, and a sub-pixel electrode of another pixel electrode is disposed inside a sub-pixel region.

11. The display panel according to claim 1, wherein the display panel comprises an array substrate and a color film substrate disposed opposite to the array substrate,
    the array substrate comprising a first substrate and a first metal layer, a first insulation layer, a second metal layer, a second insulation layer, the plurality of pixel electrodes, and a second alignment layer that are disposed on the first substrate, the scanning lines being formed at the first metal layer, and the data lines being formed at the second metal layer; and
    the color film substrate comprising a second substrate and the BM layer and the first alignment layer that are disposed on a surface of the second substrate close to the array substrate.

12. The display panel according to claim 1, wherein the display panel comprises an array substrate and a color film substrate disposed opposite to the array substrate,
    the array substrate comprising a first substrate and a first metal layer, a first insulation layer, a second metal layer, a second insulation layer, the BM layer, the plurality of pixel electrodes, and the first alignment layer that are disposed on the first substrate, the scanning lines being formed at the first metal layer, and the data lines being formed at the second metal layer; and
    the color film substrate comprising a second substrate and a second alignment layer that is disposed on a surface of the second substrate close to the array substrate.

13. A display panel, comprising scanning lines and data lines, the scanning lines and the data lines being intersected to form a plurality of pixel regions, the pixel regions comprising primary pixel regions and sub-pixel regions spaced apart from the primary pixel regions, wherein the display panel comprises:
    a plurality of pixel electrodes, the pixel electrodes comprising primary pixel electrodes and sub-pixel electrodes, the primary pixel electrode being disposed inside the primary pixel region, and the sub-pixel electrode being disposed inside the sub-pixel region;

a black matrix (BM) layer, the BM layer comprising first shading strips, second shading strips, and third shading strips, the first shading strips and the second shading strips being intersected to form a plurality of primary frame bodies, one primary frame body correspondingly enclosing a circumferential side of one pixel region, the third shading strip being disposed inside the primary frame body and correspondingly disposed between the primary pixel region and the sub-pixel region, and the third shading strip and the primary frame body defining two sub-frame bodies, a channel for making the two sub-frame bodies communicate being disposed on the third shading strip; and a first alignment layer, covering the BM layer, at least one channel being disposed in an intermediate region of the third shading strip; and the primary pixel electrode and the sub-pixel electrode overlapping partially with the third shading strip separately, wherein there are a plurality of channels, and the plurality of channels are spaced apart.

14. The display panel according to claim 13, wherein the channel is an opening.

15. The display panel according to claim 14, wherein the channel is in a structure with a wide top and a narrow bottom in a thickness direction of the third shading strip.

16. The display panel according to claim 14, wherein in an orthographic projection of the third shading strip on a plane in which the BM layer is located, a width of the channel in a direction from the intermediate region to an end surface of the channel is increasing.

17. The display panel according to claim 14, wherein in an orthographic projection of the third shading strip on a plane in which the BM layer is located, a width of the channel in a direction from the intermediate region to an end surface of the channel is equal.

18. The display panel according to claim 13, wherein the third shading strip covers an entire region between the primary pixel electrode and the sub-pixel electrode; and the third shading strip comprises a hole structure and a shading body layer, the shading body layer covering the hole structure, a hole of the hole structure forming the channel for making the two sub-frame bodies communicate.

* * * * *